United States Patent
Brennan (10) Patent No.: US 10,943,391 B2
(45) Date of Patent: Mar. 9, 2021

(54) GRAPHICS TEXTURE FOOTPRINT DISCOVERY

(71) Applicant: ADVANCED MICRO DEVICES, INC., Santa Clara, CA (US)

(72) Inventor: Christopher J. Brennan, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/221,213

(22) Filed: Dec. 14, 2018

(65) Prior Publication Data
US 2020/0193697 A1 Jun. 18, 2020

(51) Int. Cl.
| G06T 15/00 | (2011.01) |
| G06T 15/80 | (2011.01) |
| G06T 15/04 | (2011.01) |
| G06F 9/30 | (2018.01) |
| G06F 9/50 | (2006.01) |
| G06F 9/38 | (2018.01) |

(52) U.S. Cl.
CPC .......... *G06T 15/80* (2013.01); *G06F 9/30029* (2013.01); *G06F 9/3877* (2013.01); *G06F 9/5038* (2013.01); *G06T 15/04* (2013.01)

(58) Field of Classification Search
CPC .............................. G06T 15/04; G06T 15/10
USPC ........................................................ 345/418
See application file for complete search history.

(56) References Cited

U.S. PATENT DOCUMENTS

| 7,558,400 | B1 * | 7/2009 | Toksvig ................. G06T 15/04 345/586 |
| 7,619,635 | B1 * | 11/2009 | Toksvig ................. G06T 15/04 345/582 |
| 8,068,118 | B1 * | 11/2011 | Toksvig ................. G06T 15/04 345/582 |
| 9,406,168 | B1 * | 8/2016 | Baldwin ................. G06T 17/10 |
| 9,916,643 | B1 * | 3/2018 | Baldwin ................. G06T 17/10 |
| 10,354,432 | B2 * | 7/2019 | Munkberg ............ G06T 15/005 |
| 10,460,504 | B2 * | 10/2019 | Akenine-Moller ..... G06T 15/10 |
| 10,535,186 | B2 * | 1/2020 | Clarberg ................. G06F 3/013 |

(Continued)

OTHER PUBLICATIONS

Manson, Josiah, and Scott Schaefer. "Cardinality-constrained texture filtering." ACM Transactions on Graphics (TOG) 32, No. 4 (2013): 1-8.*

(Continued)

*Primary Examiner* — Phu K Nguyen (57) ABSTRACT

Accesses to a mipmap by a shader in a graphics pipeline are monitored. The mipmap is stored in a memory or cache associated with the shader and the mipmap represents a texture at a hierarchy of levels of detail. A footprint in the mipmap of the texture is marked based on the monitored accesses. The footprint indicates, on a per-tile, per-level-of-detail (LOD) basis, tiles of the mipmap that are expected to be accessed in subsequent shader operations. In some cases, the footprint is defined by a plurality of footprint indicators that indicate whether the tiles of the mipmap are expected to be accessed in subsequent shader operations. In that case, the plurality of footprint indicators are set to a first value to indicate that the tile was not access during the first frame or a second value to indicate that the tile was accessed during the first frame.

20 Claims, 7 Drawing Sheets

(56) References Cited

U.S. PATENT DOCUMENTS

2007/0070078 A1* 3/2007 Schilling ................ G06T 15/04
                                                    345/582

OTHER PUBLICATIONS

Chen B, Dachille F, Kaufman AE. Footprint area sampled texturing. IEEE Transactions on Visualization and Computer Graphics. Jun. 14, 2004;10(2):230-40.*

Manson J, Schaefer S. Cardinality-constrained texture filtering. ACM Transactions on Graphics (TOG). Jul. 21, 2013;32(4):1-8.*

Li, Mipmapping with Bidirectional Techniques, Code & Visuals, Oct. 2018; https://blog.yiningkarlli.com/2018/10/bidirectional-mipmap.html.*

* cited by examiner

GRAPHICS TEXTURE FOOTPRINT DISCOVERY

BACKGROUND

Graphics processing units (GPUs) use texture mapping to apply an image (referred to as a "texture") to the surface of a polygon. The applied texture provides additional surface detail when rendering an image of a scene for presentation on a display. Textures are typically stored as mipmaps that represent a hierarchical set of bitmap images of the main texture at reduced levels of detail. For example, if a main texture is represented by 256×256 pixels, then the mipmap set includes the main texture and a set of bitmap images at one fourth of the total area of the previous one: 128×128 pixels, 64×64 pixels, 32×32 pixels, 16×16 pixels, 8×8 pixels, 4×4 pixels, 2×2 pixels, and a single pixel (1×1). Storing a mipmap requires sufficient space to store the 256×256 pixels and an additional one third of the main texture space to store the other, reduced level of detail, bitmap images of the mipmap.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

During rendering, mipmaps that represent textures that are being rendered by a graphics pipeline in the GPU are retrieved from external memory and stored in a local memory associated with the graphics pipeline or a dynamic shader cache associated with a shader that is executing on the GPU. The retrieval process can be broken up into two stages: (1) footprint discovery and (2) fetching portions of mipmaps into the local memory or shader. Conventional footprint discovery estimates a level-of-detail (LOD) for an object that is to be rendered by the graphics pipeline. Filter logic subsequently fetches portions of mipmaps of textures used to render the object at the estimated LOD and all lower LODs. For example, if the maximum estimated LOD for an object corresponds to part of the mipmap level having 256×256 pixels, the full mipmap for the textures must be ready to render the object. However, the graphics pipeline (or the shaders that form the graphics pipeline) do not always use all of the information in the locally stored mipmap. For example, a shader that uses the main (e.g., 256×256) texture to render a texture at a high level of detail may not access large portions of the highest LOD, as well as portions of lower levels of detail in the mipmap. For another example, the shader does not access portions of the most detailed level mipmap that are not visible from the perspective of the camera or user used to render the image, such as back facing tiles. The shader also does not access LODs below the portions that are not visible to the camera or user. The storage space for the unused portion of the locally stored mipmap and the bandwidth used to move the unused portion into the local memory or cache is wasted.

FIGS. 1-7 disclose techniques for reducing storage requirements and bandwidth consumed by mipmap representations of a texture that is stored in memory or a cache by monitoring usage of the mipmap (e.g., by a shader) and, based on the monitored usage, marking a footprint in the mipmap of the texture on a per-tile, per-level-of-detail (LOD) basis. The footprint indicates portions of the mipmap that are expected to be used in subsequent shader operations. In some embodiments, the monitoring is performed during a predetermined time interval such as a draw call or frame and then the footprint of the mipmap is modified for subsequent time intervals based on the monitoring. For example, a mipmap of a texture includes a footprint indicator such as a 1-bit value for each tile at each LOD in the mipmap. A first value (e.g., "0") indicates that the tile was not accessed in the monitored time interval and a second value (e.g., "1") indicates that the tile was accessed in the monitored time interval. Values of the footprint indicator for a tile are updated in response to the tile being accessed by performing a logical-OR of a current value for the tile and the second value (e.g., "1").

In some embodiments, the footprint indicator is modified to indicate that additional tiles that were not accessed in the monitored time interval should nevertheless be generated. For example, additional tiles that border previously accessed tiles, or tiles that are at a next higher or lower LOD, can be marked using the footprint indicator of the texture in case they are needed by the shader in the subsequent time interval. In some embodiments, the footprint indicator also includes information indicating an age or priority of the values associated with the tiles of the mipmap. The values of the footprint indicator for the tiles can be modified based on the age or priority, e.g., to remove the oldest tiles or tiles that have not been accessed for a predetermined time from the texture footprint. The footprint indicator for a texture is used by filter logic to determine which tiles should be filtered, generated, or fetched for rendering an object in a subsequent frame. Tiles in the mipmap are generated using texture space shading performed by a compute shader, procedural texturing, or fetching textures from an external storage.

Figure 1:
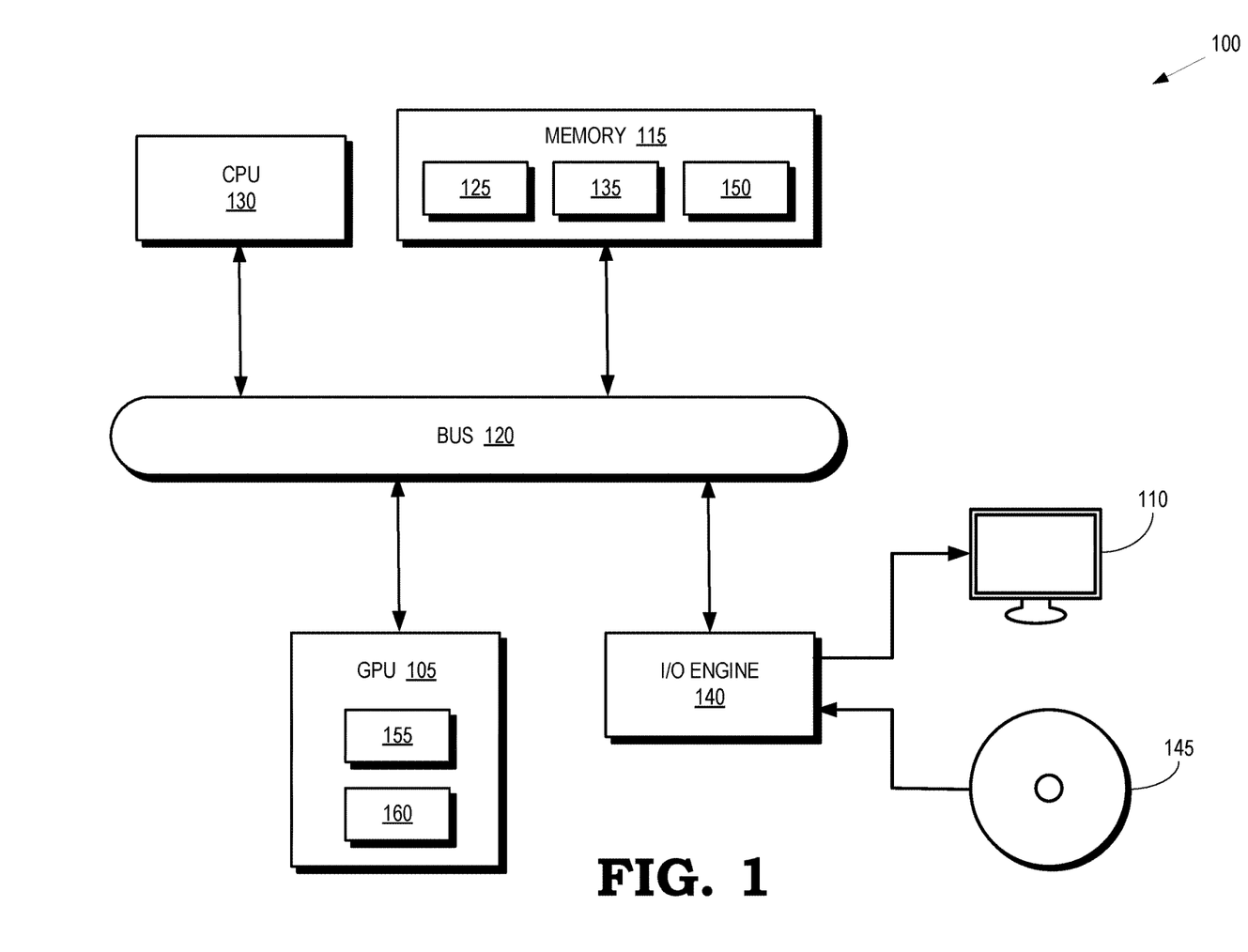
FIG. 1 is a block diagram of a processing system that includes a graphics processing unit (GPU) for creating visual images intended for output to a display according to some embodiments.

FIG. 1 is a block diagram of a processing system 100 that includes a graphics processing unit (GPU) 105 for creating visual images intended for output to a display 110 according to some embodiments. The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can execute instructions stored in the memory 115 and the GPU 105 can store information in the memory 115 such as the results of the executed instructions. For example, the memory 115 can store a copy 125 of instructions from a program code that is to be executed by the GPU 105. Some embodiments of the GPU 105 include multiple processing elements (which are conventionally referred to as compute units and are not shown in the interest of clarity) that can independently execute instructions concurrently or in parallel.

The processing system 100 includes a central processing unit (CPU) 130 for executing instructions. Some embodiments of the CPU 130 include multiple processing elements (which are conventionally referred to as processor cores and are not shown in the interest of clarity) that can independently execute instructions concurrently or in parallel. The CPU 130 is also connected to the bus 120 and can therefore communicate with the GPU 105 and the memory 115 via the bus 120. The CPU 130 can execute instructions such as program code 135 stored in the memory 115 and the CPU 130 can store information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The information included in the draw call can be referred to as a state vector that includes state information. The GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as server that streams information to the processing system, a compact disk (CD), a digital video disc (DVD), and the like. The external storage medium 145 stores information representative of program code used to implement an application such as a video game. The program code on the external storage medium 145 can be written to the memory 115 to form the copy 125 of instructions that is to be executed by the GPU 105 or the program code 135 that is to be executed by the CPU 130.

As discussed herein, the GPU 105 applies textures to surfaces of primitives or polygons that represent objects that are being rendered. The applied texture provides additional surface detail when rendering an image of an object in a scene for presentation on the display 110. Textures are stored as mipmaps that represent a hierarchical set of bitmap images of the main texture at reduced levels of detail. For example, if a main texture is represented by 256×256 pixels, then the mipmap set includes the main texture and a set of bitmap images at one fourth of the total area of the previous one: 128×128 pixels, 64×64 pixels, 32×32 pixels, 16×16 pixels, 8×8 pixels, 4×4 pixels, 2×2 pixels, and a single pixel (1×1). A mipmap of a color image includes three channels stored as separate planes that each include information that represents different colors, such as a red channel, a green channel, and a blue channel for a conventional red-green-blue (RGB) image.

Some embodiments of the GPU 105 generate tiles of the mipmap using texture space shading performed by a compute shader or procedural texturing. Tiles can also be fetched from the external storage medium 145, which stores information representative of textures that are used to render images for presentation on the display 110. Portions of the textures stored by the external storage medium 145 are written to the memory 115, which stores this information as the texture information 150.

The GPU 105 implements a graphics pipeline (not shown in FIG. 1 in the interest of clarity) that includes multiple stages configured for concurrent processing of different primitives or bins in response to a draw call. Stages of the graphics pipeline in the GPU 105 can concurrently process different primitives generated by an application, such as a video game. Processing of the primitives includes mapping textures to the primitives, e.g., to provide additional detail. During rendering, mipmaps that represent textures that are being rendered by the graphics pipeline in the GPU 105 are generated and stored in a local memory 155 associated with the graphics pipeline. In some embodiments, the graphics pipeline executes a shader and the shader is associated with a dynamic shader cache 160 to cache the textures used by the shader. In that case, the local copy of the texture information 115 is stored in the dynamic shader cache 160. However, the graphics pipeline (or the shaders that form the graphics pipeline) does not always use all of the information stored in the mipmap. For example, a shader does not access tiles of a texture that are not visible from the perspective of a camera or user that is used to render the graphics, such as back facing tiles. For another example, a shader that uses the main (e.g., 256×256) texture to render a texture at a high level of detail may not access bitmap images at lower levels of detail in the mipmap, e.g., bitmap images at 16×16 pixels, 8×8 pixels, 4×4 pixels, 2×2 pixels, and a single pixel (1×1). Thus, the storage space in the local memory 155 or the dynamic shader cache 160 for the unused portion of the mipmap, and the bandwidth of the bus 120 that is used to move the unused portion into the local memory 155 or the dynamic shader cache 160, is wasted.

The GPU 105 is therefore configured to perform dynamic footprint discovery to identify portions of the mipmap that are expected to be accessed by shaders executing on the graphics pipeline. In some embodiments, the GPU 105 monitors accesses to a mipmap stored in the local memory or cache 155 by a shader executing in the graphics pipeline. The GPU 105 marks a footprint in the mipmap of the texture based on the monitored accesses. The footprint indicates, on a per-tile, per-level-of-detail (LOD) basis, tiles of the mipmap that are expected to be accessed in subsequent shader operations. Some embodiments of the footprint are defined by a plurality of footprint indicators that indicate, on a per-tile, per-LOD basis, whether the tiles of the mipmap are expected to be accessed in subsequent shader operations. For example, each of the footprint indicators are set to either a first value to indicate that the tile was not accessed during a monitored time interval or a second value to indicate that the tile was accessed during the monitored time interval. Setting a footprint indicated to the second value indicates that the corresponding tile is expected to be accessed at the indicated LOD by a subsequent shader operation.

Figure 2:
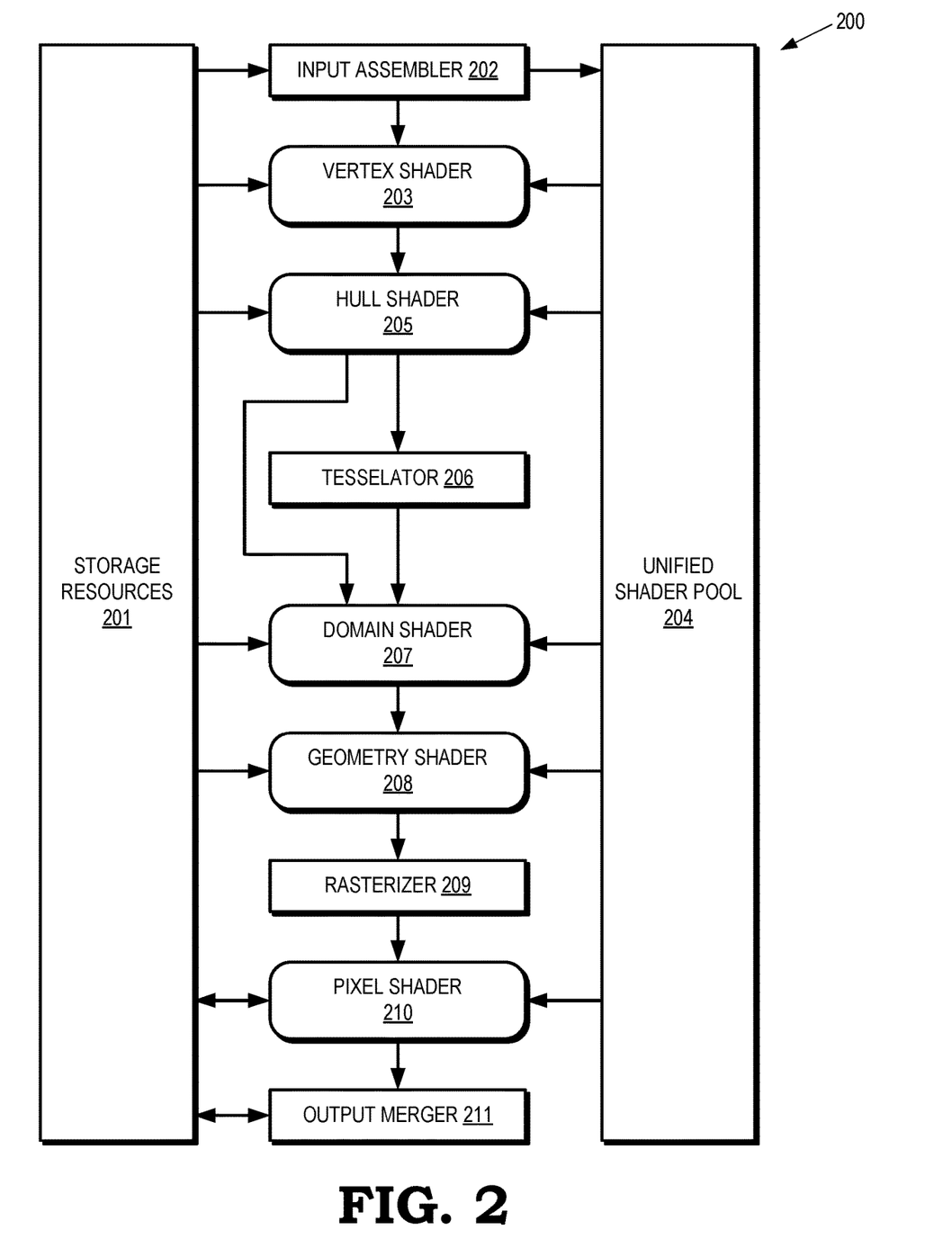
FIG. 2 depicts a graphics pipeline that is capable of processing high-order geometry primitives to generate rasterized images of three-dimensional (3-D) scenes at a predetermined resolution according to some embodiments.

FIG. 2 depicts a graphics pipeline 200 that is capable of processing high-order geometry primitives to generate rasterized images of three-dimensional (3-D) scenes at a predetermined resolution according to some embodiments. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is implemented in some embodiments of the GPU 105 shown in FIG. 1. The graphics pipeline 200 has access to storage resources 201 such as a hierarchy of one or more memories or caches that are used to implement buffers and store vertex data, texture data, and the like. The storage resources 201 are implemented using some embodiments of the memory 115 shown in FIG. 1.

An input assembler 202 is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement massive single-instruction-multiple-data (SIMD) processing so that multiple vertices can be processed concurrently. The graphics pipeline 200 shown in FIG. 2 implements a unified shader model so that all the shaders included in the graphics pipeline 200 have the same execution platform on the shared massive SIMD compute units. The shaders, including the vertex shader 203, are therefore implemented using a common set of resources that is referred to herein as the unified shader pool 204. Some embodiments of the unified shader pool 204 are implemented using processors in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

Some or all of the shaders in the graphics pipeline 200 can perform texture mapping using texture data that is stored in the storage resources 201. For example, the pixel shader 210 can read texture data from the storage resources 201 and use the texture data to shade one or more pixels. The shaded pixels are then provided to a display (such as the display 110 shown in FIG. 1) for presentation to a user.

Figure 3:
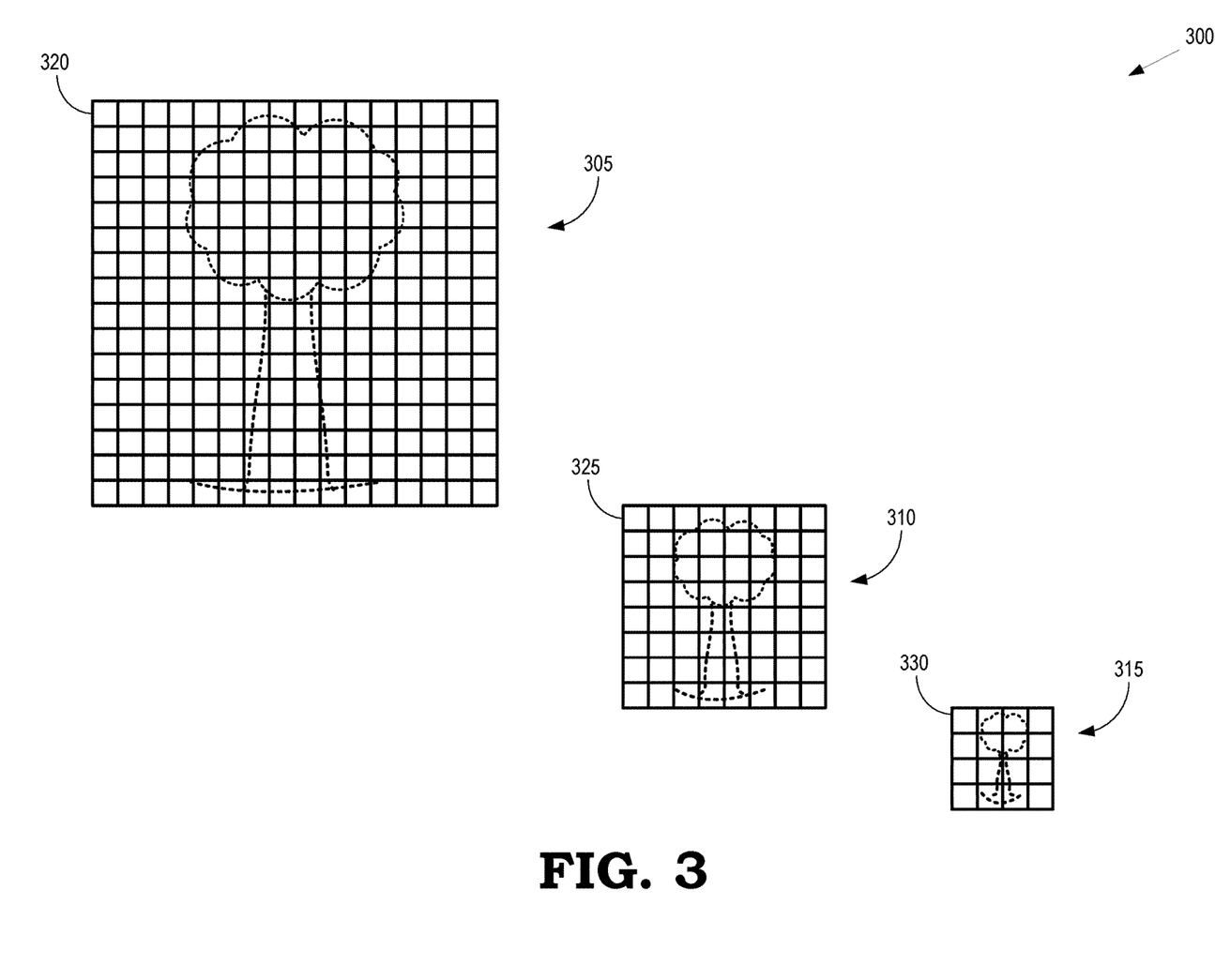
FIG. 3 is a block diagram of a subset of the levels of a mipmap of a texture according to some embodiments.

FIG. 3 is a block diagram of a subset 300 of the levels of a mipmap of a texture according to some embodiments. The subset 300 represents a subset of some embodiments of the mipmap 300 shown in FIG. 1. The subset 300 includes the texture represented at a first LOD 305, the texture represented at a second (lower) LOD 310, and the texture represented a third (lower) LOD 315. The LODs 305, 310, 315 include corresponding tiles 320, 325, 330, only one indicated by a reference numeral in each LOD in the interest of clarity. Conventional footprint discovery predicts or estimates the highest LOD that is expected to be accessed by a shader during rendering of an object that uses the corresponding texture. Filter logic subsequently fetches portions of mipmaps of textures used to render the object at the estimated LOD and all lower LODs. In the illustrated embodiment, if the conventional footprint discovery technique chooses the first LOD 305 as the highest LOD, the filter logic would subsequently fetch the first LOD 305, the second LOD 310, and the third LOD 315. As discussed herein, many tiles in the LOD 305, 310, 315, such as tiles that represent back facing or occluded portions of the object, are not accessed by the shader.

Figure 4:
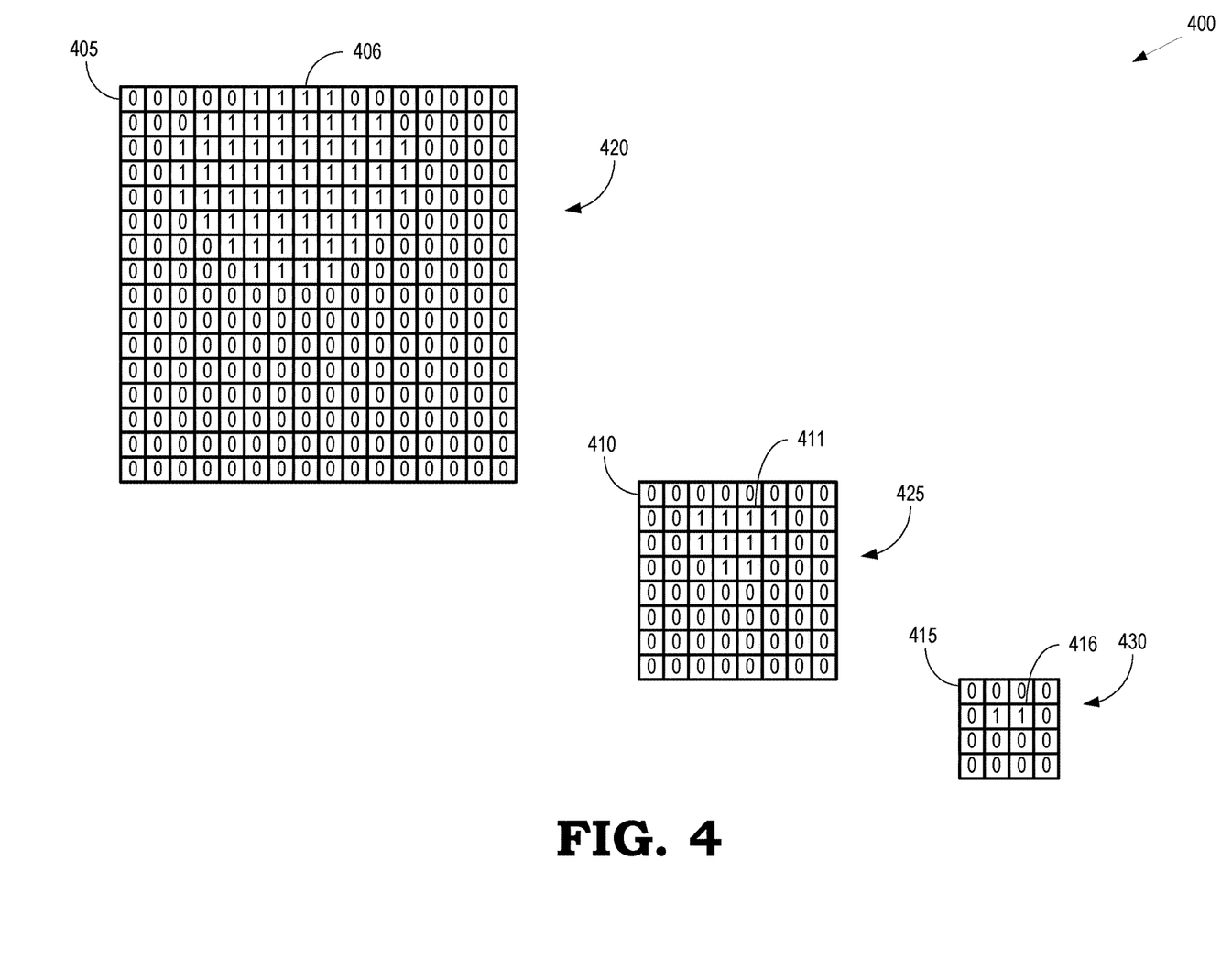
FIG. 4 is a block diagram of a per-tile, per-LOD footprint in levels of a mipmap of a texture according to some embodiments.

FIG. 4 is a block diagram of a per-tile, per-LOD footprint 400 in levels of a mipmap of a texture according to some embodiments. The footprint 400 is generated by monitoring shader accesses to tiles in a locally stored mipmap and indicates whether the tiles that each LOD are expected to be subsequently accessed by the shader. In some embodiments, the monitoring is performed during a predetermined time interval such as a draw call or a frame and the footprint 400 indicates whether the shader is expected to access the tile/LOD in a subsequent draw call or frame. The footprint 400 includes footprint indicators 405, 406, 410, 411, 415, 416 associated with tiles of a texture at levels 420, 430, 435 of a hierarchical mipmap. Some embodiments of the footprint 400 represent a per-tile, per-LOD footprint in the first LOD 305, the second LOD 310, and the third LOD 315 shown in FIG. 3.

In the illustrated embodiment, the footprint 400 includes footprint indicators 405, 406, 410, 411, 415, 416 that have 1-bit values for each tile at each LOD in the mipmap. A first value (e.g., "0") indicates that the tile was not accessed in the monitored time interval (or a previous time interval) and a second value (e.g., "1") indicates that the tile was accessed in the monitored time interval (or a previous time interval). For example, at the LOD 420, the footprint indicator 406 has a value of 1 that indicates that the corresponding tile is expected to be accessed by the shader during a subsequent time interval, draw call, or frame. For another example, at the LOD 425, the footprint indicator 411 has a value of 1 that indicates that the corresponding tile is expected to be accessed by the shader during the subsequent time interval, draw call, or frame. For yet another example, at the LOD 430, the footprint indicator 416 has a value of 1 that indicates that the corresponding tile is expected to be accessed by the shader during the subsequent time interval, draw call, or frame. The footprint indicators 405, 410, 415 have the values of 0 that indicate that the corresponding tile is not expected to be accessed by the shader during the subsequent time interval, draw call, or frame.

Figure 5:
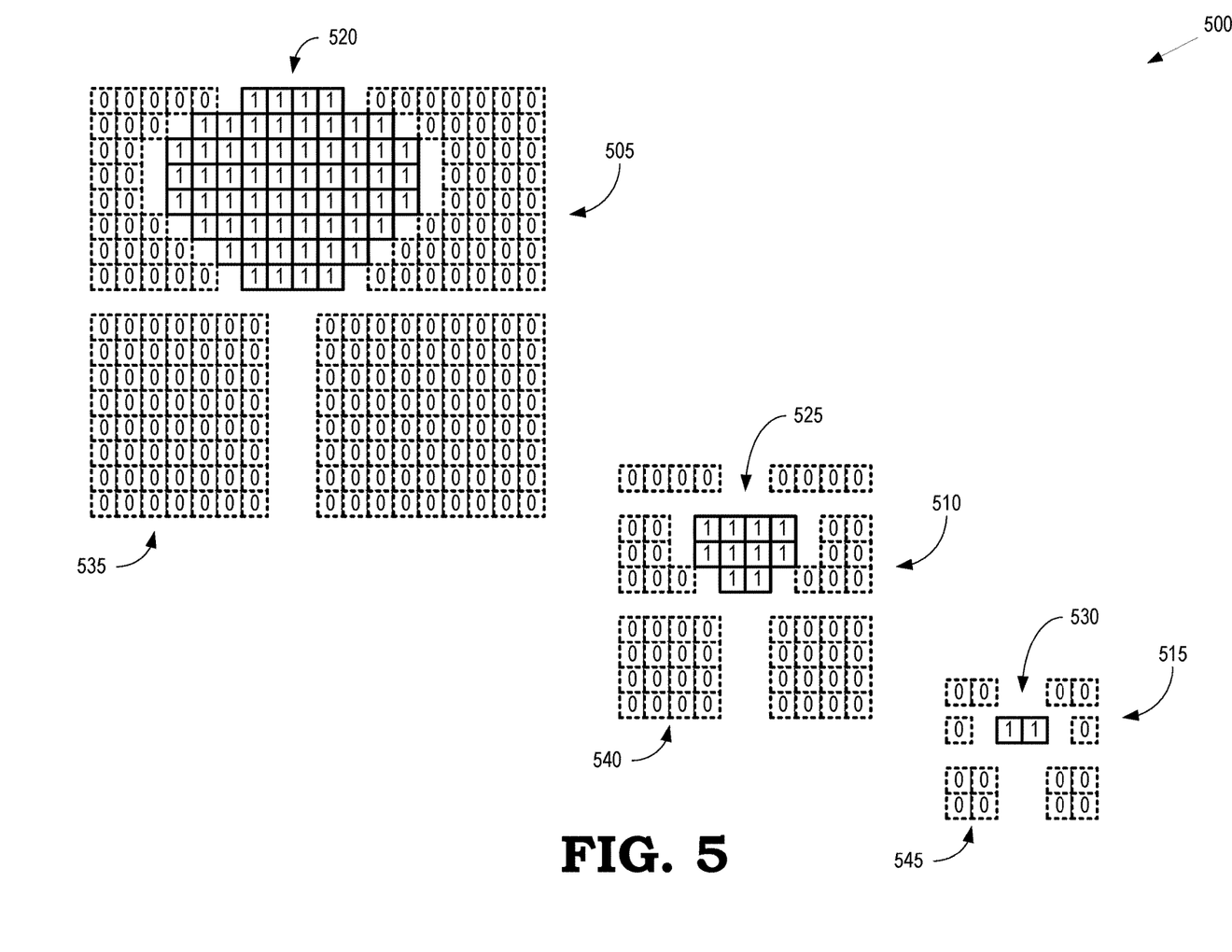
FIG. 5 is a block diagram of a per-tile, per-LOD footprint in levels of a mipmap of a texture with the accessed portions highlighted according to some embodiments.

FIG. 5 is a block diagram of a per-tile, per-LOD footprint 500 in levels of a mipmap of a texture with the accessed portions highlighted according to some embodiments. Some embodiments of the footprint 500 correspond to the footprint 400 shown in FIG. 4 that is generated by monitoring shader accesses to tiles in a locally stored mipmap and indicates whether the tiles that each LOD are expected to be subsequently accessed by the shader. The footprint 500 is associated with tiles of a texture at levels 505, 510, 515 of a hierarchical mipmap. Some embodiments of the footprint 500 represent a per-tile, per-LOD footprint in the first LOD 305, the second LOD 310, and the third LOD 315 shown in FIG. 3.

The footprint 500 includes portions 520, 525, 530 (indicated by solid line boxes) that include footprint indicators that indicate that the corresponding tile is expected to be accessed by the shader, e.g., because the corresponding tile was accessed by the shader in a previous draw call or frame. In some embodiments, the portions 520, 525, 530 include footprint indicators associated with tiles that are adjacent to tiles that were previously accessed. Tiles can be adjacent within the LOD 505, 510, 515 or between the LOD 505, 510, 515. The footprint 500 also includes portions 535, 540, 545 (indicated by dotted line boxes) that include footprint indicators that indicate that the corresponding tile is not expected to be accessed by the shader, e.g., because the corresponding tile was not accessed by the shader in a previous draw call or frame. The portions 520, 525, 530 are separated from the portions 535, 540, 545 for illustrative purposes in FIG. 6.

In some embodiments, footprint indicators are added to the portions 535, 540, 545 by modifying the value of the footprint indicator based on an age or a priority associated with the tile or the footprint indicator. For example, a footprint indicator is set to a value of 0 if the corresponding tile has not been accessed for a predetermined number of frames. For another example, footprint indicators are set to a value of 0 if a priority associated with the corresponding tile is below a threshold priority. Combinations of age and priority are also used to determine whether to modify the value of the footprint indicator in some embodiments.

Figure 6:
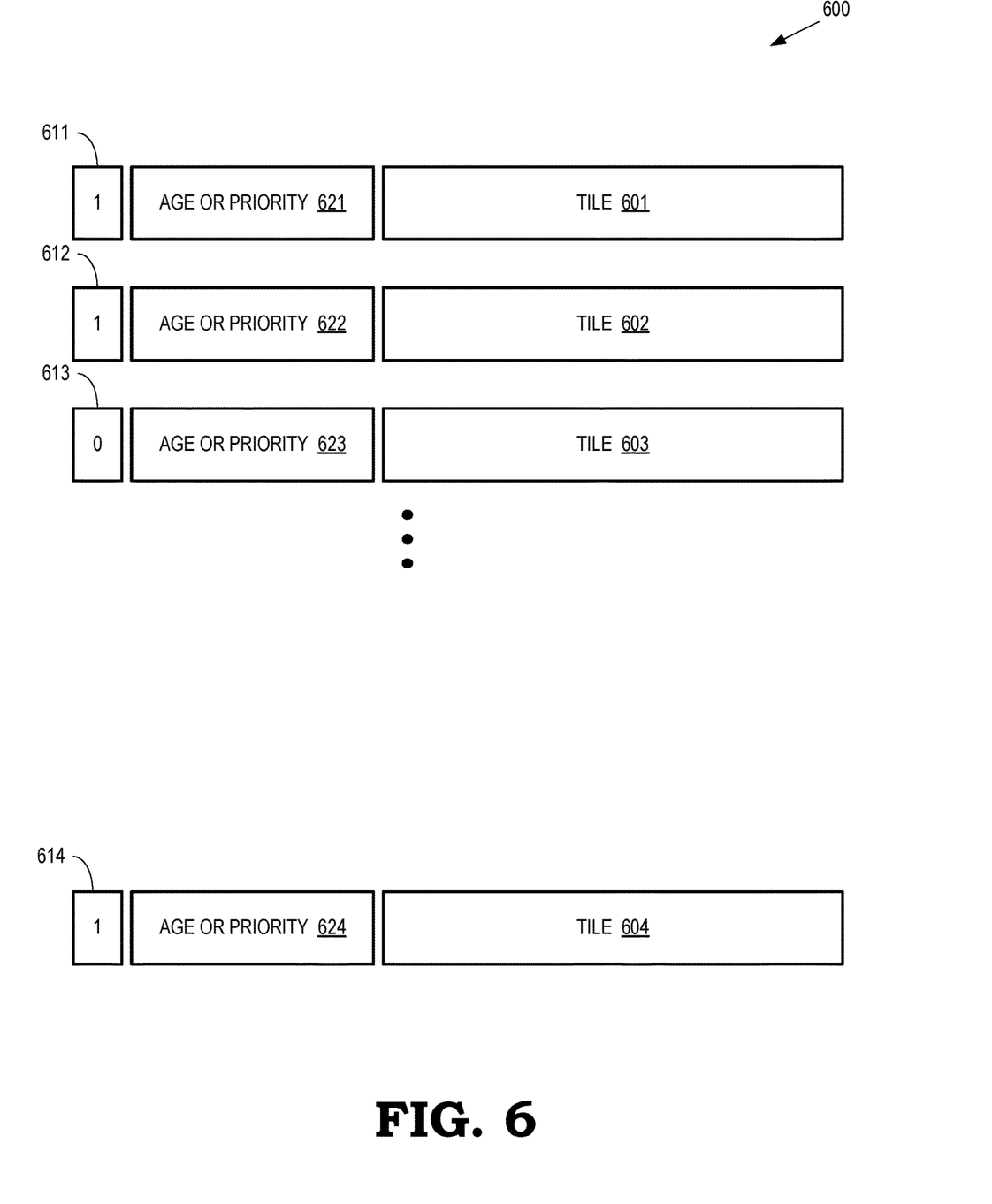
FIG. 6 is a block diagram of a texture that is marked to indicate a footprint of the texture according to some embodiments.

FIG. 6 is a block diagram of a texture 600 that is marked to indicate a footprint of the texture 600 according to some embodiments. The texture 600 is accessed by a shader in a graphics pipeline executing on some embodiments of the GPU 105 shown in FIG. 1, and some embodiments of the graphics pipeline 200 shown in FIG. 2. The texture 600 includes tiles 601, 602, 603, 604, which are collectively referred to herein as "the tiles 601-604." Footprint indicators associated with the tiles 601-604 include the fields 611, 612, 613, 614, which are collectively referred to herein as "the fields 611-614," are associated with the tiles 601-604 and can be set to different values to indicate whether the corresponding tiles 601-604 are within a footprint of the texture 600. In the illustrated embodiment, the fields 611, 612, 614 are set to a value of "1" to indicate that the corresponding tiles 601, 602, 604 are within the footprint of the texture 600 and are expected to be accessed by the shader. The field 613 is set to a value of "0" to indicate that the corresponding tile 603 is not within the footprint of the texture 600.

Additional information is included in other fields of the footprint indicators for the tiles 601-604 of the texture 600. In the illustrated embodiment, the footprint indicators include one or more fields 621, 622, 623, 624 (collectively referred to herein as "the fields 621-624") to store information indicating an age associated with the footprint indicator, a priority associated with the footprint indicator, or a combination thereof. For example, the field 621-624 can include information indicating a number of frames since the corresponding tiles 601-604 were accessed by the shader. For another example, the fields 621-624 can include information indicating a high, medium, or low priority associated with the corresponding tiles 601-604.

In some embodiments, the additional information in the other fields of the footprint indicators are used to generate or modify a footprint within the texture 600. For example, the footprint can be modified to remove tiles that have exceeded a predetermined age or are the oldest tiles in the footprint. For another example, the footprint can be modified to add or remove tiles from the footprint based on their priorities. In some embodiments, the field 621-624 are maintained and defined by a user application (e.g., software) without hardware assistance beyond provision of the footprint bits 611-614. The user application post-processes the bits 611-614 and updates the corresponding data structures in order to budget which tiles get loaded or updated.

Figure 7:
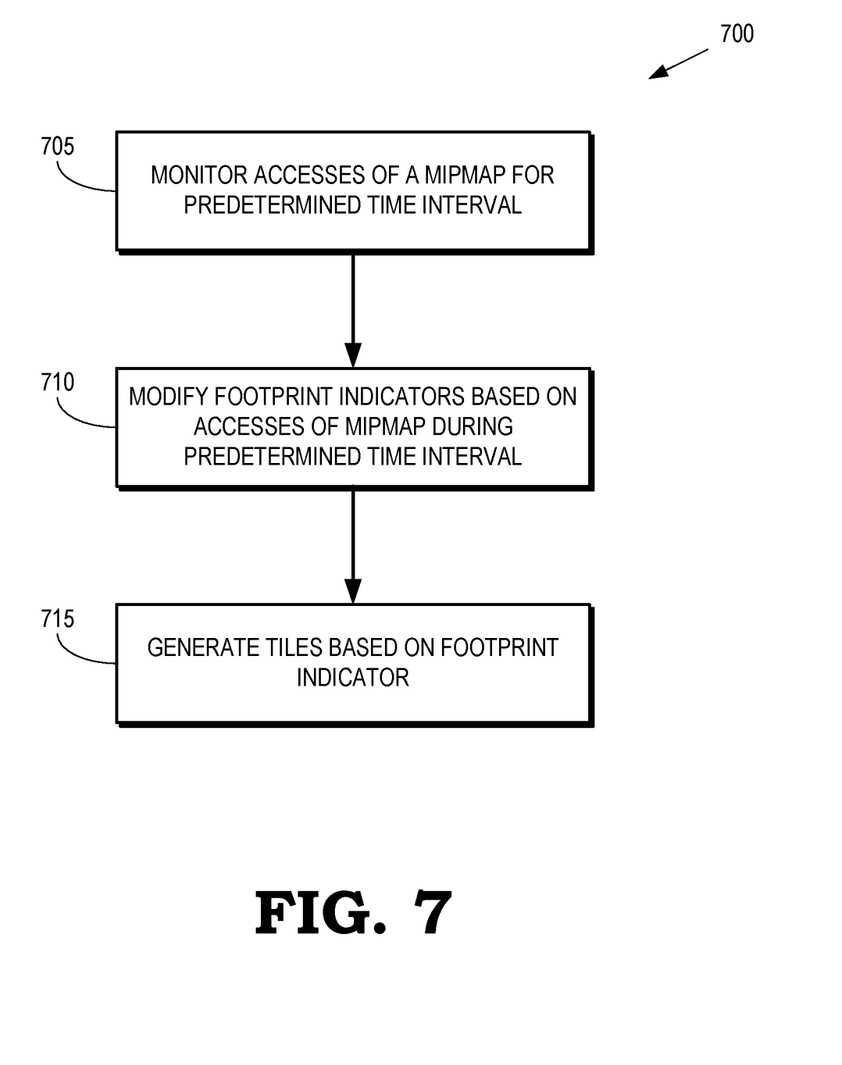
FIG. 7 is a flow diagram of a method of generating a footprint indicating tiles within a mipmap that are expected to be accessed by a shader in a graphics pipeline according to some embodiments.

FIG. 7 is a flow diagram of a method 700 of generating a footprint indicating tiles within a mipmap that are expected to be accessed by a shader in a graphics pipeline according to some embodiments. The method 700 is implemented in some embodiments of the GPU 105 shown in FIG. 1, and some embodiments of the graphics pipeline 200 shown in FIG. 2.

At block 705, a processor monitors accesses to tiles in a mipmap of a texture by the shader over a predetermined time interval such as a draw call or a frame. Monitoring the mipmap includes identifying tiles in the mipmap that are accessed by the shader and used to render objects for display.

At block 710, the processor modifies footprint indicators based on the mipmap accesses. Modifying the footprint indicators includes setting a value of a footprint indicator associated with a tile at an LOD in the mipmap in response to determining that the shader accessed the tile at the LOD during the predetermined time interval. The value of the footprint indicator is set to indicate that the accessed tile is expected to be accessed by the shader in a subsequent time interval, draw call, or frame, e.g., by setting the footprint indicator to a value of "1." Footprint indicators associated with tiles at LOD in the mipmap that are not accessed during the predetermined time interval can also be modified based on the monitoring.

In some embodiments, the processor performs a logical-OR of a previous value of the footprint indicator (e.g., the value prior to the monitored time interval) and a value that indicates whether the tile was accessed in the predetermined time interval. For example, if the previous value of the footprint indicator is "0" and monitoring indicates that the tile was accessed during the monitoring interval indicating a value of "1," the logical-OR operation sets the value of the footprint indicator to "1." For another example, if the previous value of the footprint indicator is "1" and monitoring indicates that the tile was not access during the monitoring interval indicating a value of "0," the logical-OR operation also sets the value of the footprint indicator to "1." Some embodiments of the processor modify the value of the footprint indicator based on an age or priority associated with the footprint indicator, e.g., by setting the value of the footprint indicator to "0" if the corresponding tile has not been accessed for a predetermined number of draw calls or frames. Some embodiments of the processor modify the value of footprint indicators associated with tiles that are adjacent to the tiles that were accessed during the monitoring interval to indicate that the adjacent tiles are also expected to be accessed by the shader during a subsequent operation.

At block 715, the processor generates tiles based on the footprint indicator. In some embodiments, the processor generates tiles associated with values of the footprint indicator that indicate that the corresponding tiles are expected to be accessed by the shader. Thus, the processor generates only the tiles that are expected to be used and does not expand processing power, bandwidth, or storage on tiles that are not expected to be used. Generating the tiles includes using texture space shading performed by a compute shader, procedural texturing, or fetching texture information from an external storage.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    monitoring accesses to a mipmap by a shader in a graphics pipeline, wherein the mipmap is stored in a memory or cache associated with the shader, and wherein the mipmap represents a texture at a hierarchy of levels of detail; and
    marking a footprint in the mipmap of the texture based on the monitored accesses, wherein the footprint indicates, on a per-tile, per-level-of-detail (LOD) basis, tiles of the mipmap that are expected to be accessed in subsequent shader operations.

2. The method of claim 1, wherein monitoring accesses to the mipmap by the shader comprises determining that the shader accessed a first tile at a first LOD in the mipmap.

3. The method of claim 2, wherein the footprint is defined by a plurality of footprint indicators that indicate, on a per-tile, per-LOD basis, whether the tiles of the mipmap are expected to be accessed in subsequent shader operations.

4. The method of claim 3, wherein each of the plurality of footprint indicators are set to a first value to indicate that corresponding tiles were not accessed during a monitored time interval or a second value to indicate that corresponding tiles were accessed during the monitored time interval.

5. The method of claim 4, wherein marking the footprint in the mipmap of the texture comprises setting a first footprint indicator of the plurality of footprint indicators to the second value to indicate that the first tile at the first LOD is included in the footprint in response to detecting that the shader accessed the first tile at the first LOD during the monitored time interval.

6. The method of claim 5, wherein setting the first footprint indicator comprises performing a logical-OR of a value of the first footprint indicator prior to the monitored time interval and the second value.

7. The method of claim 5, further comprising:
    setting at least one second footprint indicator to the second value to indicate that at least one second tile adjacent to the first tile is expected to be accessed during the subsequent shader operations.

8. The method of claim 3, wherein the plurality of footprint indicators comprises information indicating at least one of ages and priorities associated with the plurality of footprint indicators.

9. The method of claim 8, further comprising:
modifying at least one of the plurality of footprint indicators based on at least one corresponding age or priority indicated in the at least one footprint indicator.

10. An apparatus comprising:
a memory or cache to store a mipmap for access by a shader in a graphics pipeline, wherein the mipmap represents a texture at a hierarchy of levels of detail; and
a processor configured to monitor accesses to the memory or cache by the shader and mark a footprint in the mipmap of the texture based on the monitored accesses, wherein the footprint indicates, on a per-tile, per-level-of-detail (LOD) basis, tiles of the mipmap that are expected to be accessed in subsequent shader operations.

11. The apparatus of claim 10, wherein the processor is configured to determine that the shader accessed a first tile at a first LOD in the mipmap.

12. The apparatus of claim 11, wherein the footprint is defined by a plurality of footprint indicators that indicate, on a per-tile, per-LOD basis, whether the tiles of the mipmap are expected to be accessed in subsequent shader operations.

13. The apparatus of claim 12, wherein the processor is configured to set each of the plurality of footprint indicators to a first value to indicate that corresponding tiles were not access during a monitored time interval or a second value to indicate that corresponding tiles were accessed during the monitored time interval.

14. The apparatus of claim 13, wherein the processor is configured to set a first footprint indicator of the plurality of footprint indicators to the second value to indicate that the first tile at the first LOD is included in the footprint in response to detecting that the shader accessed the first tile at the first LOD during the monitored time interval.

15. The apparatus of claim 14, wherein the processor is configured to set the first footprint indicator by performing a logical-OR of a value of the first footprint indicator prior to the monitored time interval and the second value.

16. The apparatus of claim 14, wherein the processor is configured to set at least one second footprint indicator to the second value to indicate that at least one second tile adjacent to the first tile is expected to be accessed during the subsequent shader operations.

17. The apparatus of claim 12, wherein the plurality of footprint indicators comprises information indicating at least one of ages and priorities associated with the plurality of footprint indicators.

18. The apparatus of claim 17, wherein the processor is configured to modify at least one of the plurality of footprint indicators based on at least one corresponding age or priority indicated in the at least one footprint indicator.

19. A method comprising:
marking a footprint in a mipmap of a texture in response to detecting accesses to the mipmap by a shader in a graphics pipeline during a first frame, wherein the mipmap is stored in a memory or cache associated with the shader, wherein the mipmap represents the texture at a hierarchy of levels of detail, and wherein the footprint indicates, on a per-tile, per-level-of-detail (LOD) basis, tiles of the mipmap that are expected to be accessed in a second frame subsequent to the first frame; and
generating textures for storage in a memory or cache associated with the shader based on the footprint.

20. The method of claim 19, wherein the footprint is defined by a plurality of footprint indicators that indicate, on a per-tile, per-LOD basis, whether the tiles of the mipmap are expected to be accessed in subsequent shader operations, and wherein marking the footprint comprises setting each of the plurality of footprint indicators to a first value to indicate that the tile was not access during the first frame or a second value to indicate that the tile was accessed during the first frame.

* * * * *